(12) United States Patent
Abramczyk et al.

(10) Patent No.: US 7,350,803 B2
(45) Date of Patent: Apr. 1, 2008

(54) SIDE AIRBAG SYSTEM

(75) Inventors: Joseph E. Abramczyk, Farmington Hills, MI (US); Kurt L. Ewing, Plymouth, MI (US); Robert J. Mezzadri, Livonia, MI (US); Thomas M. Frusti, deceased, late of Livonia, MI (US); by Lanese Frusti, legal representative, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

(21) Appl. No.: 10/906,231

(22) Filed: Feb. 10, 2005

(65) Prior Publication Data
US 2006/0175812 A1    Aug. 10, 2006

(51) Int. Cl.
*B60R 21/207* (2006.01)
(52) U.S. Cl. .................................. 280/730.2
(58) Field of Classification Search ............. 280/730.1
See application file for complete search history.

(56) References Cited
U.S. PATENT DOCUMENTS

| | | | |
|---|---|---|---|
| 5,639,111 A | 6/1997 | Spencer et al. | |
| 5,651,582 A | 7/1997 | Nakano | |
| 5,678,853 A | 10/1997 | Maly | |
| 5,746,443 A | 5/1998 | Townsend | |
| 5,762,363 A | 6/1998 | Brown et al. | |
| 5,845,932 A | 12/1998 | Kimura et al. | |
| 6,145,870 A | 11/2000 | Devane et al. | |
| 6,155,593 A | 12/2000 | Kimura et al. | |
| 2002/0060447 A1 | 5/2002 | Acker et al. | |
| 2006/0113751 A1* | 6/2006 | Tracht et al. | 280/728.2 |

* cited by examiner

Primary Examiner—Faye M. Fleming
(74) Attorney, Agent, or Firm—Frank MacKenzie; Dickinson Wright PLLC

(57) ABSTRACT

A side airbag system (12) for a vehicle is provided. The side airbag system (12) includes a seatback frame (16) having a front side (20), a rear side (22), and an outboard side (24). The outboard side (24) of the seatback frame (16) has an airbag module (26) coupled thereto and extending substantially outboard from the seatback frame (16). The airbag module (26) is positioned for deploying an airbag (30) substantially forward. The rear side (22) of the seatback frame (10) has a rear cover panel (40) attached thereon. This rear cover panel (40) is a one-piece element for covering the airbag module (26) and both the rear side (22) and the outboard side (24) of the seatback frame (16). The system (12) also includes foam cushion padding (34), which is deformed by the airbag (30) upon its deployment.

11 Claims, 3 Drawing Sheets

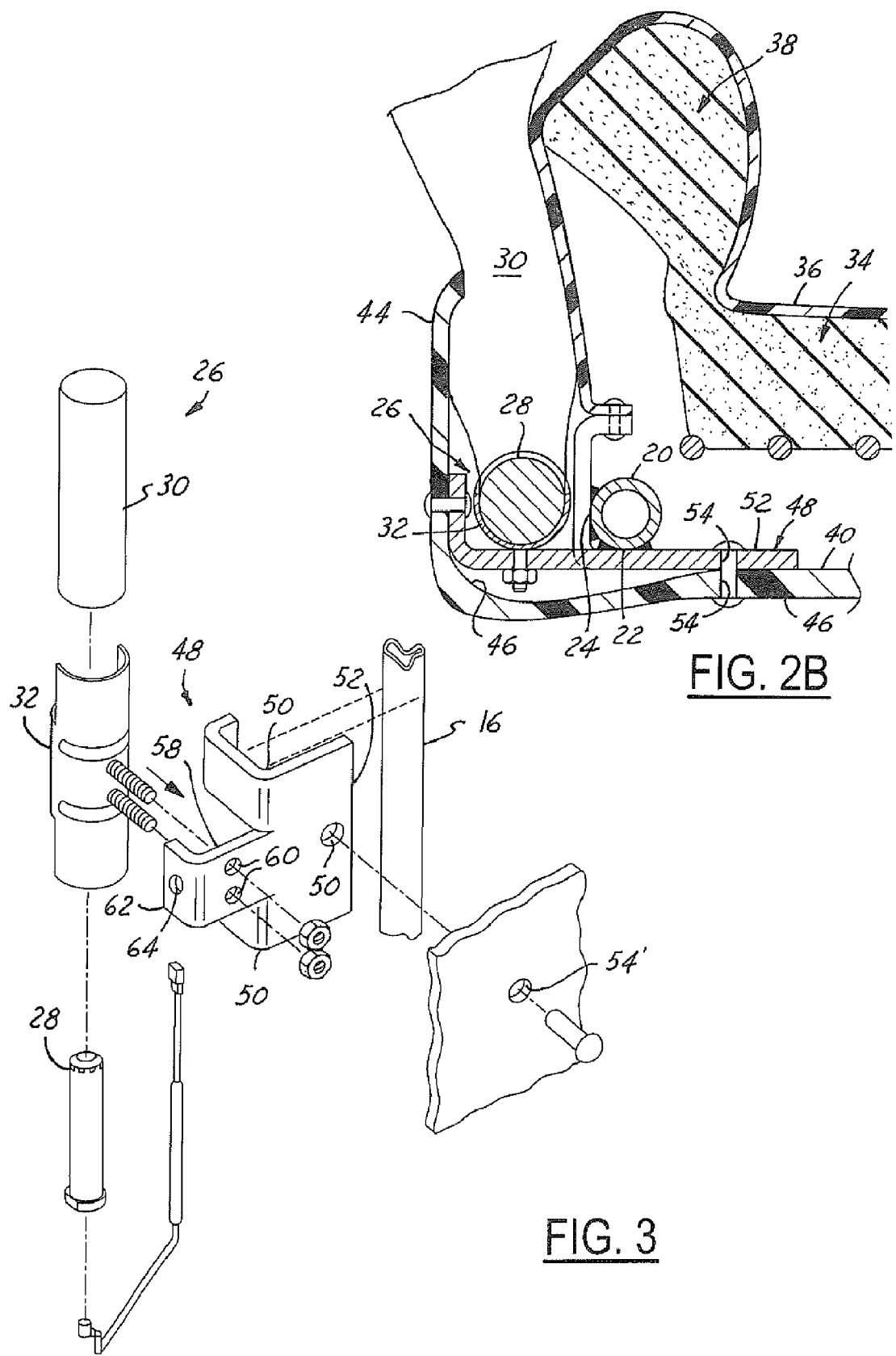

SIDE AIRBAG SYSTEM

TECHNICAL FIELD

The present invention relates generally to supplemental restraint systems of vehicles, and more particularly to an improved side airbag system that can deploy an airbag in a substantially forward direction utilizing sufficiently few parts for decreasing manufacturing time, material costs, and various other costs associated therewith.

BACKGROUND

Side airbag systems for automotive vehicles are well known. Current side airbag systems typically include an airbag module mounted to a seatback frame. Usually, both the airbag module and the seatback frame are at least partially surrounded by foam cushion and one or more panels of seatback trim, which lines the foam cushion. The seatback trim can be stitched with a rip seam for easily tearing and allowing the airbag to deploy therethrough. Other side airbag systems utilize a door for deploying the airbag therethrough instead of the rip seam.

Optimal deployment of side airbags through rip seams typically requires that approximately three general design requirements are satisfied. First, the rip seam typically must be positioned within a predetermined region with respect to the airbag module. Second, the trim ordinarily must be comprised of a material having a predetermined strength, elasticity, or various other qualities. Finally, the rip seam normally must be stitched according to a predetermined sewing method. However, it will be appreciated that the manufacturers can require that various other general design requirements be satisfied as well.

A drawback of these systems is that each time that the seatback trim is replaced or otherwise adjusted, the system typically must be re-tested according to design requirements, such as those generally exemplified above. In that regard, repairing or adjusting the seatback trim can require additional time and labor thereby resulting in a somewhat burdensome and cost prohibitive construction.

Another drawback of these side airbag systems is that they typically require a guide member for directing the airbag in a forward direction when the airbag is deployed. Specifically, the system can include an inflator device positioned on a rear portion of the seatback for inflating and deploying a side airbag relatively outboard. In that regard, the system typically further includes a guide member for deflecting the airbag forward.

Therefore, it would be desirable to provide an improved side airbag system having fewer parts, requiring lower installation costs, and being able to deploy substantially forward with sufficient pressure in an even quicker period of time than existing side airbags.

SUMMARY OF THE INVENTION

One embodiment of the present invention is a side airbag system for a vehicle. The side airbag system includes a seatback frame having a front side and a rear side in a lengthwise direction of the vehicle, as well as an outboard side in a widthwise direction of the vehicle. The outboard side of the seatback frame has an airbag module coupled adjacent thereto. This airbag module extends substantially outboard from the seatback frame. The airbag module includes an inflator device, which is coupled to the seatback frame, and an airbag that is coupled to the inflator device. The inflator device is positioned for deploying the airbag substantially forward. The rear side of the seatback frame has a rear cover panel attached thereon. This rear cover panel is a one-piece element for covering the airbag module, as well as the rear side and the outboard side of the seatback frame. In this embodiment, the seatback includes foam cushion padding, which is deformed by the airbag upon its deployment.

One advantage of the present invention is that a side airbag system is provided that deploys an airbag substantially forward and does not require a guiding member for re-directing the airbag forward.

Another advantage of the present invention is that a side airbag system is provided that deploys an airbag in a substantially straight and forward direction so as to increase deployment speed.

Yet another advantage of the present invention is that a side airbag system is provided that deploys an airbag in a substantially straight and forward direction so as to improve airbag pressure requirements or otherwise increase airbag stiffness when the vehicle occupant presses into the airbag.

Still another advantage of the present invention is that a side airbag system is provided having substantially few components for decreasing material costs, manufacturing time, and other costs associated therewith.

Other advantages of the present invention will become apparent upon considering the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of the examples of the invention:

FIG. 2B is a cross-sectional view of the improved airbag system shown in FIG. 2A, illustrating the system in a deployed configuration.

FIG. 3 is an exploded partially cutaway view of the improved airbag system shown in FIGS. 2A and 2B.

DETAILED DESCRIPTION OF THE INVENTION

Figure 1A:
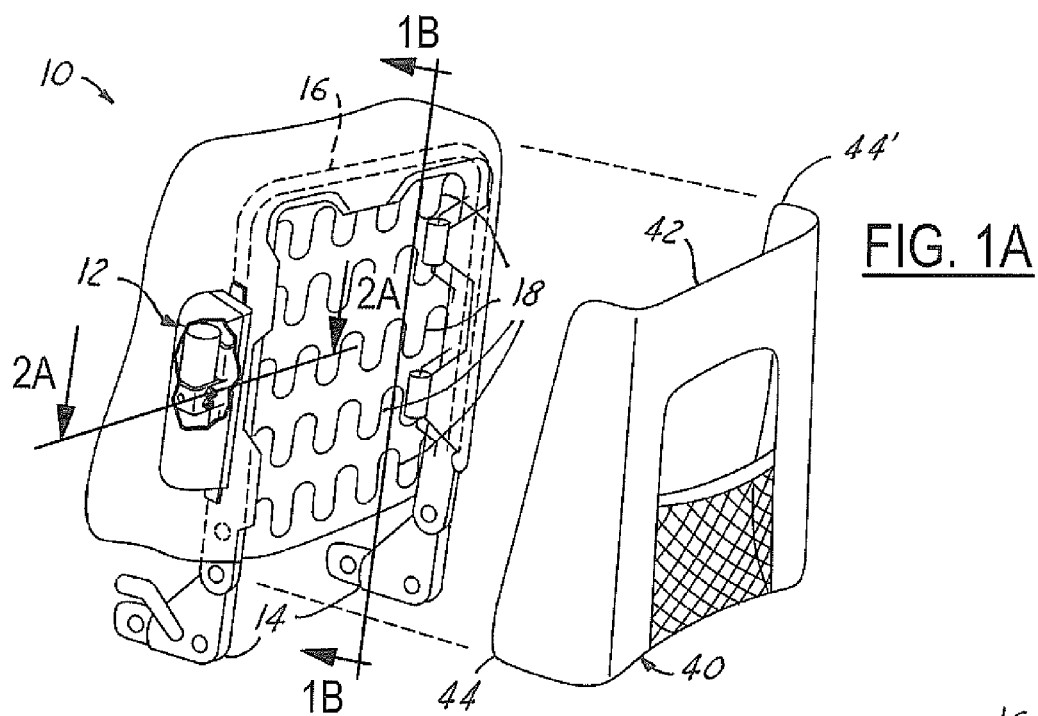
FIG. 1A is a partially exploded view of a seatback for a vehicle seat, illustrating an improved airbag system mounted on the seatback, according to one advantageous embodiment of the claimed invention.

In the following figures, the same reference numerals are used to identify the same components in the various views.

The present invention is particularly suited for an improved side airbag system mounted on the seatback of a vehicle seat. In this regard, the embodiments described herein employ structural features where the context permits. However, it is understood that a variety of other embodiments without the described features are contemplated as well. For example, the improved side airbag can be utilized on other portions of the seat or vehicle for protecting occupants in various kinds of collisions. For this reason, it follows that the invention can be carried out in a variety of other modes and utilized for other suitable applications as desired.

Figure 1B:
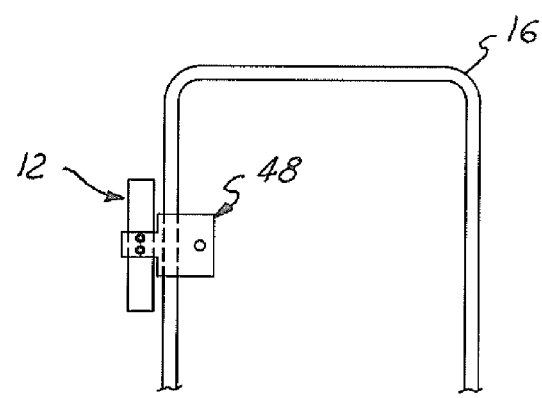
FIG. 1B is a rear plan view of a seatback frame for the seatback shown in FIG. 1A as taken along line 1B-1B, illustrating an airbag module coupled to an outboard side of the frame and extending outboard therefrom.

Referring to FIGS. 1A and 1B, there is shown a seatback 10 for a vehicle seat with an improved side airbag system 12 ("system") mounted thereon, in accordance with one advantageous embodiment of the claimed invention. The seatback 10 includes two anchoring mechanisms 14, which are intended to be mounted to a floorpan of the vehicle for securing the seatback 10 thereto. However, it will be appreciated that more or less than two anchoring mechanisms can be utilized as desired. The anchoring mechanisms 14 have a seatback frame 16 attached thereon. In this embodiment, the seatback frame 16 has a generally U-shaped construction with a series of springs 18 attached to the frame 16 for providing lumbar support for an occupant. Yet, it is contemplated that the seatback frame 16 can have various other constructions. One such construction is detailed in the description for FIGS. 4A and 4B.

Figure 2A:
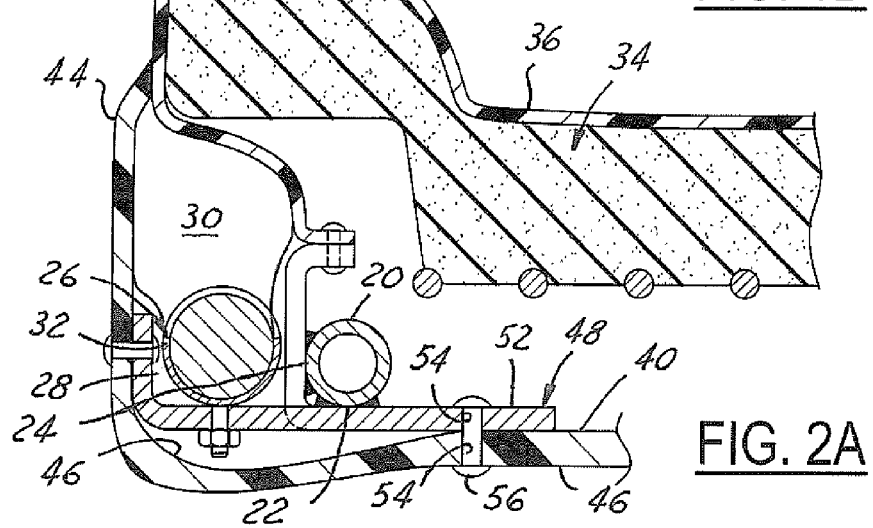
FIG. 2A is a cross-sectional view of the improved airbag system as mounted to an assembled seatback and taken along line 2A-2A in FIG. 1.

As best shown in FIGS. 2A and 2B, the seatback frame 16 has a front side 20 and a rear side 22, as seen from a lengthwise direction of the vehicle. In addition, the seatback frame 16 also includes an outboard side 24 as viewed in a widthwise direction of the vehicle. The particular seatback 10 shown in the figures is part of a driver-side seat but can instead be a part of various other seats desired.

In accordance with the claimed invention, the outboard side 24 of the seatback frame 16 has an airbag module 26 fixedly disposed adjacent thereto. Specifically, as best shown in FIG. 3, the airbag module 26 includes an inflator device 28, an airbag 30 coupled to the inflator device 28, and a housing 32 at least partially surrounding the inflator device 28 and the airbag 30. In this way, the airbag module 26 extends outboard from the seatback frame 16 and is sufficiently positioned for deploying an airbag 30 in a substantially straight direction toward the front of the vehicle. This feature is beneficial because it dispenses with the need for re-directing or otherwise guiding the airbag 30 toward the front of the vehicle. For that reason, the airbag 30 can be deployed within a substantially quick period of time. In addition, a decreased amount of pressure can be utilized for fully deploying the airbag 30.

Referring back to FIGS. 2A and 2B, the system 12 further includes a foam cushion padding 34 and trim 36 lining the padding 34, which are both disposed generally in front of both the seatback frame 16 and the springs 18. This foam cushion padding 34 is utilized for cushioning a person who occupies the seat. The foam cushion padding 34 includes a side-padding portion 38 for supporting the occupant as he is subjected to a lateral acceleration during turns or other vehicle maneuvers. As best shown in FIG. 2B, this side-padding portion 38 is displaced and/or deformed generally forward and/or inboard when the airbag 30 is deployed. This feature is beneficial because it enables the airbag module 26 to be mounted to the outboard side 24 of the seatback frame 16 while still supporting or cushioning the occupant.

Referring back to FIG. 1, the system 12 further includes a rear cover panel 40 fixedly coupled to the seatback frame 16. The rear cover panel 40 is a one-piece construction with a panel portion 42 and a pair of flange portions 44, 44' extending from opposing sides of the panel portion 42. The panel portion 42 is utilized for covering the springs 18 and the rear side 22 of the seatback frame 16. The outboard flange portion 44 is intended to cover the airbag module 26 and the outboard side 24 of the seatback frame 16.

As best illustrated in FIGS. 2A and 2B, the rear cover panel 40 preferably is comprised of a substantially rigid material for fixing the flange portion 44 at a predetermined position relative to the panel portion 42. The rear cover panel 40 may also include one or more, e.g. ribs or other increased thickness portions, which are located at corners or other stress-riser portions of the panel 40. In this way, the flange portion 44 can guide the airbag 30 forward as it is being deployed. However, it is understood that the level of rigidity can be generally low since the airbag 30 already is positioned for deploying in a substantially forward direction. In that respect, the rear cover panel 40 can instead have substantially low levels of rigidity, flexibility, or strength as desired.

Referring now to FIG. 3, the system 12 further includes a mounting bracket 48 for attaching the rear cover panel 40 and the airbag module 26 to the seatback frame 16. This mounting bracket 48 includes one or more L-shaped portions 50 for attachment to the seatback frame by way of welding. However, it will be appreciated that the attachment can instead be accomplished by rivet fasteners, bolt fasteners, various other suitable fastening methods, or any combination thereof.

Furthermore, the mounting bracket 48 includes an inboard-extending tab 52 for supporting and/or attaching the panel portion 42 of the rear cover panel 40 thereto. This inboard-extending tab 52 is an integral part in connection between the L-shaped portions 50 of the mounting bracket 48. This inboard-extending tab 52 has a hole 54 formed therein for receiving a bolt or rivet fastener 56, which attaches the panel portion 42 of the rear cover panel 40 to the mounting bracket 48. Similarly, the rear cover panel 40 has an opposing hole 54' formed therein for receiving the fastener 56. However, it will be appreciated that various other suitable constructions can be utilized for mounting the rear cover panel 40 to the seatback 10 as desired.

Moreover, the mounting bracket 48 also includes an outboard-extending tab 58 for attaching the airbag module 26 thereto. Specifically, the outboard-extending tab 58 has an aperture 60 formed therein for receiving a bolt or rivet fastener 56', which attaches the housing 32 of the airbag module 26 to the mounting bracket 48. However, similar to the inboard-extending tab 52, it is understood that a variety of other suitable constructions can be utilized as desired.

The outboard-extending tab 58 has a lip portion 62 extending therefrom for supporting the flange portion 44 of the rear cover panel 40. In this embodiment, the lip portion 62 also has an opening 64 formed therein for receiving a bolt or rivet fastener 56", which is intended to attach the flange portion 44 of the rear cover panel 40 to the mounting bracket 48. Likewise, the rear cover panel 40 has an opening 64' formed therein for receiving the fastener 56". In other embodiments, this lip portion 62 can have other suitable constructions or even be omitted from the mounting bracket 48 as desired.

Figure 4A:
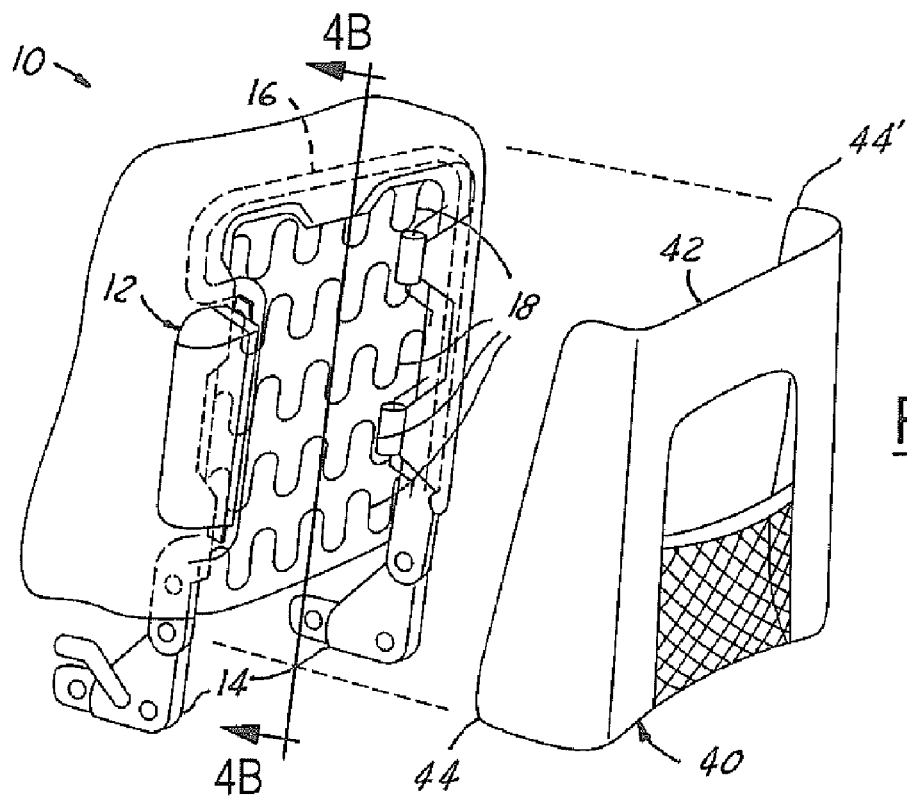
FIG. 4A is a partially exploded view of the seatback shown in FIG. 1A, according to another advantageous embodiment of the claimed invention.
Figure 4B:
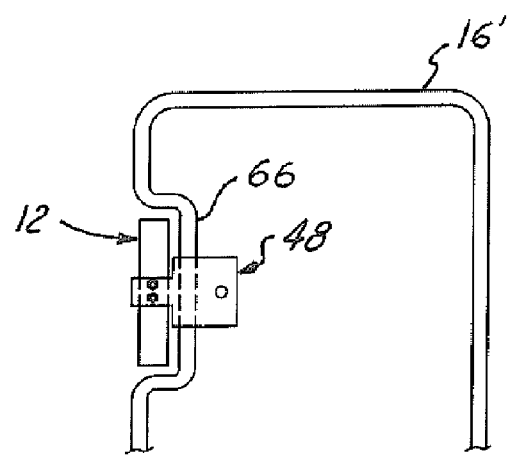
FIG. 4B is a rear plan view of a seatback frame for the seatback shown in FIG. 4A as taken along 4B-4B, illustrating the seatback frame having a recessed portion for mounting an airbag module thereon.

Referring now to FIGS. 4A and 4B, there is shown the seatback 10 shown in FIG. 1, according to another advantageous embodiment of the claimed invention. In this embodiment, the seatback frame 16' has recessed portion 66 for mounting the airbag module on the seatback frame 16'.

In that regard, the entire height of the side-padding portion 38 is collectively supported by the seatback frame 16' and the airbag module.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A side airbag system for a vehicle, comprising:
    a seatback frame having a front side and a rear side both in a lengthwise direction of the vehicle, said seatback frame further including an outboard side in a widthwise direction of the vehicle;
    an airbag module disposed adjacent to said outboard side of said seatback frame and extending substantially outboard therefrom, said airbag module including an airbag and an inflator device positioned for deploying said airbag substantially forward; and
    a rear cover panel coupled to said seatback frame, said rear cover panel having a panel portion for covering said rear side of said seatback frame, said rear cover panel further including a flange portion for covering both said airbag module and said outboard side of said seatback frame, wherein said seatback frame has a mounting bracket coupled thereto for attaching said airbag module to said seatback frame, with said inflator device being coupled to said mounting bracket and positioned so as to deploy said airbag substantially forward.

2. The side airbag system as recited in claim 1 wherein mounting bracket has at least one L-shaped portion for attachment to said rear side and said outboard side of said seatback frame.

3. The side airbag system as recited in claim 2 wherein said mounting bracket includes at least one outboard-extending tab, said at least one outboard-extending tab for mounting said inflator device thereon and positioning said inflator device for deploying said airbag substantially forward.

4. The side airbag system as recited in claim 3 wherein at least one outboard-extending tab includes a lip portion extending therefrom for contacting said flange portion of said rear cover panel and distributing a load thereacross.

5. The side airbag system as recited in claim 4 wherein said lip portion has an opening formed therein and said flange portion has an opposing opening formed therein for receiving a fastener and coupling said flange portion of said rear cover panel to said lip portion of said mounting bracket.

6. The side airbag system as recited in claim 1 wherein said rear cover panel is substantially rigid that said flange portion remains fixed at a predetermined position relative to said panel portion when said airbag is deployed.

7. A side airbag system for a vehicle, comprising:
    a seatback frame having a front side, a rear side, and an outboard side;
    a foam cushion padding disposed adjacent to said front side of said seatback frame, said foam cushion padding having a side padding portion that extends from said front side of said seatback frame forward in a lengthwise direction of the vehicle and outboard in a widthwise direction of the vehicle;
    a seatback trim covering both said foam cushion padding and said outboard side of said seatback frame;
    an airbag module disposed adjacent to said outboard side of said seatback frame external to said seatback trim, said airbag module extending from said seatback frame substantially outboard, said airbag module including a side airbag and an inflator device positioned for deploying said airbag substantially forward; and
    a rear cover panel coupled to said seatback frame, said rear cover panel having a panel portion for covering said rear side of said seatback frame and a flange portion for covering said outboard side of said seatback frame;
    wherein said inflator device deploys said airbag in a substantially forward direction causing said airbag to deform said side padding portion of said foam cushion padding; and
    wherein said inflator device is coupled to a mounting bracket positioned for deploying said airbag substantially forward, with said mounting bracket including at least one outboard-extending tab for mounting said inflator device thereon.

8. The side airbag system as recited in claim 7 wherein mounting bracket has at least one L-shaped portion for attachment to said rear side and said outboard side of said seatback frame.

9. The side airbag system as recited in claim 7 wherein at least one outboard-extending tab includes a lip portion extending therefrom for contacting said flange portion of said rear cover panel and distributing a load thereacross.

10. The side airbag system as recited in claim 9 wherein said lip portion has an opening formed therein and said flange position has an opposing opening formed therein for receiving a fastener and coupling said flange portion of said rear cover panel to said lip portion of said mounting bracket.

11. The side airbag system as recited in claim 7 wherein said rear cover panel is substantially rigid that said flange portion remains fixed at a predetermined position relative to said panel portion when said airbag is deployed.

* * * * *